US008675637B2

(12) United States Patent
Kumarasamy et al.

(10) Patent No.: US 8,675,637 B2
(45) Date of Patent: Mar. 18, 2014

(54) INTERWORKING BETWEEN H.320/H.324 AND SIP

(75) Inventors: Parameswaran Kumarasamy, San Jose, CA (US); Yu Zhang, Cupertino, CA (US); Sabita Jasty, San Jose, CA (US); Mark Conner, Boulder Creek, CA (US); Sandeep Singh Bhupinder Kohli, Fremont, CA (US); Paul R. P. Chu, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 1263 days.

(21) Appl. No.: 11/737,017

(22) Filed: Apr. 18, 2007

(65) Prior Publication Data

US 2008/0259907 A1     Oct. 23, 2008

(51) Int. Cl.
*H04L 12/66*      (2006.01)
*H04L 12/28*      (2006.01)
*H04J 3/16*       (2006.01)

(52) U.S. Cl.
USPC ........... 370/352; 370/389; 370/401; 370/466; 370/467

(58) Field of Classification Search
None
See application file for complete search history.

(56) References Cited

U.S. PATENT DOCUMENTS

| | | | |
|---|---|---|---|
| 7,002,989 B2* | 2/2006 | Agrawal et al. | 370/467 |
| 2004/0042607 A1* | 3/2004 | Gallant et al. | 379/220.01 |
| 2004/0047342 A1* | 3/2004 | Gavish et al. | 370/352 |
| 2004/0076145 A1* | 4/2004 | Kauhanen et al. | 370/352 |
| 2005/0058088 A1* | 3/2005 | Decker et al. | 370/260 |
| 2005/0238000 A1* | 10/2005 | Pollock et al. | 370/352 |
| 2006/0007954 A1* | 1/2006 | Agrawal et al. | 370/466 |
| 2006/0126605 A1* | 6/2006 | Kajiwara | 370/356 |
| 2006/0239242 A1* | 10/2006 | Huffschmid | 370/352 |
| 2007/0195802 A1* | 8/2007 | Kallio et al. | 370/401 |
| 2007/0286165 A1* | 12/2007 | Chu et al. | 370/352 |
| 2007/0291776 A1* | 12/2007 | Kenrick et al. | 370/401 |
| 2007/0297339 A1* | 12/2007 | Taylor et al. | 370/248 |
| 2008/0075261 A1* | 3/2008 | Ramanathan et al. | 379/220.01 |

FOREIGN PATENT DOCUMENTS

| | | |
|---|---|---|
| WO | WO-02052825 A1 | 7/2002 |
| WO | WO-2008130963 A2 | 10/2008 |
| WO | WO-2008130963 A3 | 10/2008 |

OTHER PUBLICATIONS

Rosenberg et al. SIP: Session Initiation Protocol, Jun. 2002, Network Working Group RFC 3261, All Pages.*
"3rd Generation Partnership Project ; Technical Specification Group Core Network and Terminals ; Feasibility Study for the multi-media inter-working between the IP Multimedia Core Network Subsystem and Circuit Switched networks", '3GPP TR 29.863 V7.1.0, [Online]. Retrieved from the Internet: <URL: http://www.3gpp1.com/ftp/Specs/archive/29_series/29.863/2986>3-710.zip>, (Mar. 1, 2007), p. 8, 17.
Taylor, N., "Decoupled Session Signaling in a Multimedia Gateway", U.S. Appl. No. 60/735,270, filed Nov. 9, 2005, 26 p.

* cited by examiner

*Primary Examiner* — Brandon Renner
(74) *Attorney, Agent, or Firm* — Schwegman Lundberg & Woessner, P.A.

(57) ABSTRACT

Disclosed are a method, apparatus and system for interworking between H.320 or H.324 and SIP. The method comprises receiving a SIP message indicative of capabilities supported by a first endpoint device and deferring responding to the SIP message. The method further comprises receiving from a second endpoint device an H.320 or H.324 message indicative of the capabilities supported by the second endpoint device in response thereto responding to the SIP message thereby to establish a media communication channel between the first and second endpoint devices based on their respective capabilities.

16 Claims, 10 Drawing Sheets

INTERWORKING BETWEEN H.320/H.324 AND SIP

FIELD

This application relates to telecommunications and particularly to a method and apparatus for interworking between H.320/H.324 and SIP.

BACKGROUND

With the increasing popularity of VoIP (Voice over Internet Protocol), deployments of VoIP are increasing. Although VoIP is currently used primarily for voice calls, video calls are becoming increasingly popular.

H.320 and H.323 are protocols predominantly used for transmitting video over circuit-switched networks, for example ISDN (Integrated Services Digital Network) and PSTN (Public Switched Telephone Network). SIP (Session Initiation Protocol) is designed to address the functions of signalling and session management within a packet-switched network, for example IP networks such as the Internet and/or LANs (Local Area Networks), for both audio and video.

Thus, a way of interworking or facilitating communication between an H.320/H.324 endpoint and a SIP endpoint or between two H.320/H.324 endpoints across a SIP network is proposed.

BRIEF DESCRIPTION OF DRAWINGS

The example embodiments are illustrated by way of example and not limitation in the figures of the accompanying drawings, in which like references indicate similar elements and in which.

DETAILED DESCRIPTION OF EXAMPLE EMBODIMENTS

In the following description, for purposes of explanation, numerous specific details are set forth in order to provide a thorough understanding of example embodiments. It will be evident, however, to one skilled in the art that the example embodiments may be practiced without these specific details.

Overview

In an example embodiment, there is provided a method, apparatus and system for interworking between H.320/H.324 and SIP. The method comprises receiving a SIP message indicative of capabilities supported by a first endpoint device and deferring responding to the SIP message. The method further comprises receiving from a second endpoint device an H.320/H.324 message indicative of the capabilities supported by the second endpoint device and responding to the SIP message thereby to establish a media communication channel between the first and second endpoint devices based on their respective capabilities.

DETAILED DESCRIPTION OF THE DRAWINGS

Figure 1:
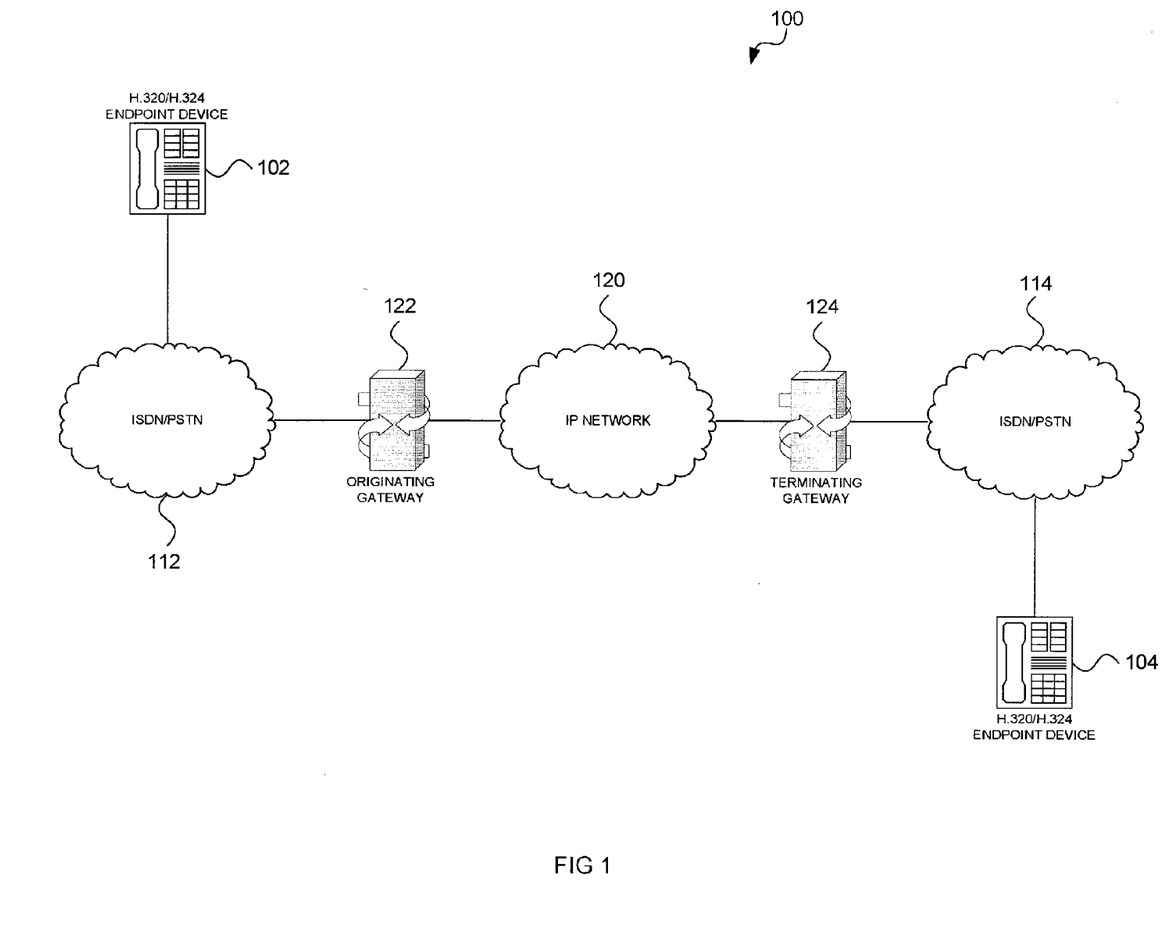
FIG. 1 shows a schematic view of a system for interworking between H.320/H.324 and SIP, in accordance with an example embodiment, the system including at least one packet-switched network and two circuit switched networks.

FIG. 1 shows a system 100 for interworking between H.320/H.324 and SIP, in accordance with an example embodiment. The system 100 comprises at least two communication endpoint devices 102, 104, although it is to be appreciated that more endpoint devices may be included. In an example embodiment, both endpoint devices 102, 104 are operable to communicate via a circuit-switched network for example one or more ISDNs (Integrated Services Digital Networks) or PSTNs (Public Switched Telephone Networks). Thus, each endpoint device 102, 104 is respectively connected to an ISDN/PSTN 112, 114. The endpoint devices 102, 104 may be in the form mobile or cellular telephones, landline telephones or the like. Further, the endpoint devices 102, 104 may have video capabilities. It is possible that the ISDNs/PSTNs 112, 114 may overlap, at least partially.

H.320 and H.324 are protocols adapted for use across a circuit-switched network 112, 114 and use for example TDM (Time Division Multiplexing) to transmit a plurality of audio and/or video (further collectively referred to as media) channels or streams across the networks 112, 114. H.320 and H.324 broadly are quite similar protocols (although the specifics of their implementation may differ) and the system 100 is thus further described with reference to both protocols.

The system 100 further includes at least one packet-switched network, which in this example embodiment is an IP network 120 which may include one or more LANs (Local Area Networks), the Internet, any other IP-based network, or a combination thereof. SIP is a packet-based protocol which may be transmitted across the IP network 120. It is to be appreciated that H.320/H.324 and SIP protocols operate quite differently from each other because of the nature of the networks 112, 114, 120 across which they are transmitted. For instance, to establish a communication channel using only H.320/H.324, capabilities of endpoint devices are first exchanged and then a logical channel between the respective endpoints is opened. In contrast, to establish a communication channel using only SIP, capability and channel information can be exchanged almost simultaneously because network packets typically do not follow a fixed path or logical channel.

Therefore, stated differently, an example embodiment provides a method, apparatus and system for mapping between H.320/H.324 and SIP such that endpoint devices may communicate with each other using these protocols without any modification to the endpoint devices.

The system 100 further includes at least two gateways 122, 124 to interconnect various networks. Gateways 122, 124 may provide, among other things, a translation function between SIP endpoints and other terminal types. This function includes translation between transmission formats and between communication procedures. In addition, the Gateways 122, 124 may translate between audio and video codecs and perform call setup and clearing on both a packet-switched network side and a circuit-switched network side, if present. If the endpoint device 102 initiates a connection to endpoint device 104, the gateway 122 may be referred to as the originating gateway and the gateway 124 may be referred to as the terminating gateway.

The system 100 may be used to connect two endpoint devices 102, 104 using H.320 or H.324 protocol (therefore referred to as H.320/H.324 endpoint devices). Although each endpoint device 102, 104 is connected to an ISDN/PSTN 112, 114 there is an intermediate IP network 120. This configuration may be useful for example to extend the range over which the endpoint devices 102, 104 can communicate, especially if the IP network 120 is the Internet. In accordance with an example embodiment, protocol commands issued from the ISDN/PSTN 112, 114 to or received from the IP network 120 may be mapped or translated from one protocol to another thereby to facilitate communication between networks 112, 114, 120. The gateways 122, 124 may be apparatus which map or translate functionality of messages or commands in one protocol (e.g. H.320/H.324) to another protocol (e.g. SIP) thereby to interwork communications between various networks 112, 114, 120 and/or endpoint devices 102, 104. In particular, the system 100 may find applicability in facilitating communications (e.g., video calls) between endpoint devices 102, 104 which themselves communicate in the same protocol (e.g. H.320/H.324) across a plurality of network's 112, 114, 120 which communicate in different protocols (e.g. H.324/H.320 and SIP).

Figure 2:
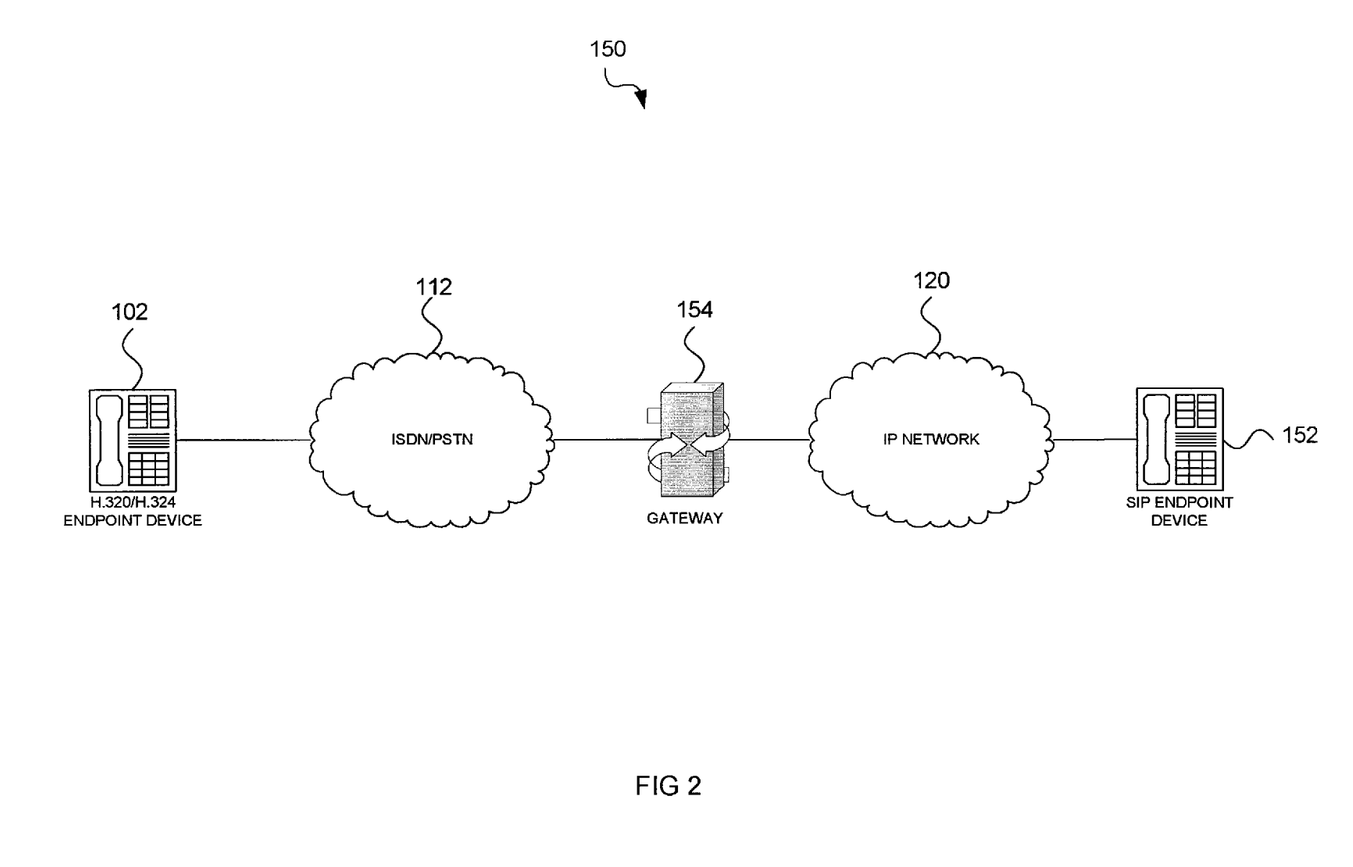
FIG. 2 shows a schematic view of a system for interworking between H.320/H.324 and SIP, in accordance with an example embodiment, the system including at least one packet-switched network and one circuit switched network.

Referring now to FIG. 2, reference numeral 150 generally indicates a system for interworking between H.320/H.324 and SIP, in accordance with an example embodiment. The system 150 (in contrast with the system 100) includes an H.320/H.324 endpoint device 102 as well as a SIP endpoint device 152. Thus, the SIP endpoint device 152 is connected to the IP network 120. The SIP endpoint device 152 may, for example, be in the form of an IP telephone (e.g. a VoIP telephone), a computer with a telephony interface, or any communication device (e.g., with audio only or audio and video capabilities).

Again, a gateway 154 is used to interconnect the ISDN/PSTN 112 with the IP network 120. The system 150 may therefore facilitate communications between endpoint devices 102, 152 each of which communicate in different protocols.

Figure 3:
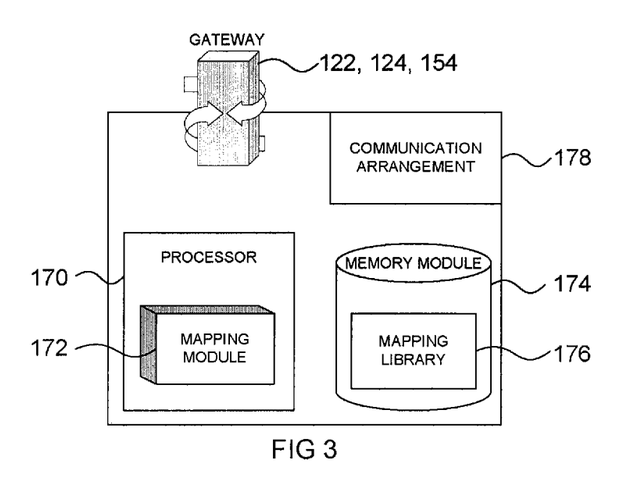
FIG. 3 shows a schematic view of an apparatus of FIGS. 1 and 2 for interworking between H.320/H.324 and SIP, in accordance with an example embodiment.

Referring to FIG. 3, an apparatus in the example form of a gateway (e.g., a gateway 122, 124, 154) is shown in more detail. The gateway is shown by way of example to include a processor 170, a memory module 174 and a communication arrangement 178.

The processor 170 comprises a mapping module 172 which may be a conceptual module corresponding to a functional task performed by the processor 170. In such case, the gateway 122, 124, 154 may include a machine readable medium, e.g. main memory and/or a hard disk drive, which carries thereon a set of instructions to direct the operation of the processor 170. It is to be understood that the gateway 122, 124, 154 may comprise one or more microprocessors, controllers, DSMs (Digital Signal Modules), or any other suitable computing device, resource, hardware, software, and/or embedded logic. The mapping module 172 is operable to map functionality from one protocol to another protocol. Thus, the mapping module 172 is operable or configured to trigger the sending of a message in one protocol in response to receiving a message in a different protocol.

As stated above, H.320/H.324 and SIP are different protocols and thus a command in one protocol may not necessarily have an exact corresponding command in the other protocol. Thus, when mapping commands from one protocol to another, a combination or series of commands may be needed to map similar functionality between the protocols.

To this end, the memory module 174 may include a mapping library 176 which is accessible by the mapping module 172. The mapping library 176 may indicate or identify which protocol commands or instructions should be sent in response to a particular command received. The gateways 122, 124, 154 may be operable or configured to send and receive communication messages via the communication arrangement 178 (e.g., communication interfaces) which may be connected to at least two communication networks.

The mapping module 172 may direct the operation of the communication arrangement 178 thereby to dictate the particular messages or commands which are sent by the communication arrangement 178. Depending on the particular configuration of the gateway 122, 124, 154, the communication arrangement 178 may act as a receiving module, a sending module or a responding module.

Figure 4:
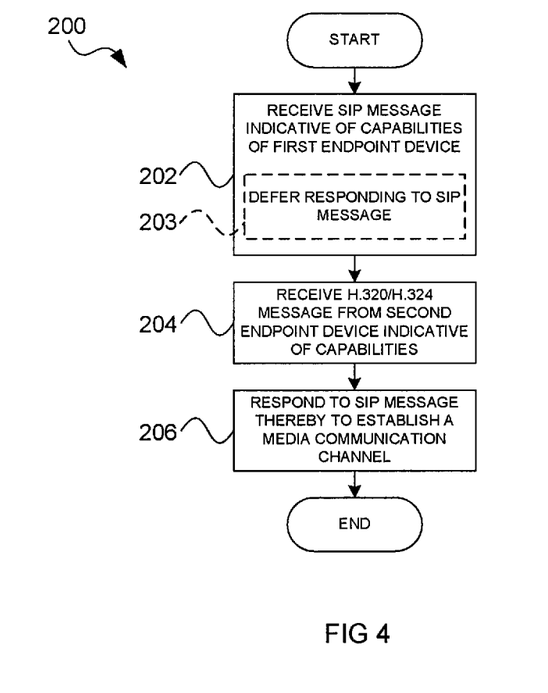
FIG. 4 shows a flow diagram of a method for interworking between H.320/H.324 and SIP, in accordance with an example embodiment.

Example embodiments will now be further described by way of example with reference to FIGS. 4 to 10. FIG. 4 shows a high-level flow diagram of a method 200 for interworking between H.320/H.324 and SIP, in accordance with an example embodiment.

A SIP message or command is received, at block 202, which is indicative of capabilities supported by a first endpoint device. Depending on the configuration of the system or apparatus which is implementing the method 200, the first endpoint device may be a SIP endpoint device (e.g. endpoint device 152) or may be an H.320/H.324 endpoint device (e.g. endpoint device 102, 104) connected via a network implementing SIP (e.g. IP network 120). The SIP message may be in the form of an INVITE message or a 200 OK command. Conventionally, at least in communications between two or more SIP endpoint devices, the SIP message may have been responded to without any intervening H.320/H.324 messages (with or without intervening SIP messages) thereby to establish a media communication channel between endpoint devices. In accordance with an example embodiment, the method 200 includes deferring, at block 203, responding to the SIP message.

An H.320/H.324 message or command is then received, at block 204, from a second endpoint device indicative of the capabilities supported by the second endpoint device. The second endpoint device may be an H.320/H.324 endpoint device, for example endpoint device 102, 104. The H.320/H.324 message may be in the form of a TCS (Terminal Capability Set) command in the case of an H.324 endpoint device or in the form of a CAPS message in the case of an H.320 endpoint device.

Thereafter, a response message is sent, at block 206, in response to the original SIP message (received at block 202) to establish a media communication channel. The response message may be a 200 OK message (e.g. if the original SIP message was an INVITE message) or may be an ACK message (e.g. if the original SIP message was a 200 OK message). In an example embodiment, the original SIP message is always an INVITE message. Accordingly, the sequence of messages may be an INVITE, a 200 OK, and an ACK. If the Session Description Protocol (SDP) came in the INVITE, the response to the SDP will be a SDP in 200 OK. If the original SDP came in the 200 OK, the response to that SDP will be the SDP in ACK. SDP is a format for describing streaming media initialization parameters for the purposes of session announcement, session invitation, and other forms of multimedia session initiation. SDP is published under the IETF as RFC 4566.

The method 200 may include intermediate steps such as sending an H.320/H.324 message to prompt the second endpoint device for its capabilities and opening a logical channel to the second endpoint device, which are illustrated by way of example in FIGS. 5 to 10.

Example embodiments will now be illustrated in more detail with reference to FIGS. 5 to 10 which show interaction diagrams of communication messages in a method for interworking between H.320/H.324 and SIP, in accordance with an example embodiment. The methods of FIGS. 5 to 10 describe the method of FIG. 4 in more detail. FIGS. 5 to 10 are also described with reference to the systems and apparatus in FIGS. 1 to 3, although it is to be appreciated that the method may find applicability in other systems or apparatus which are not illustrated.

Figure 5:
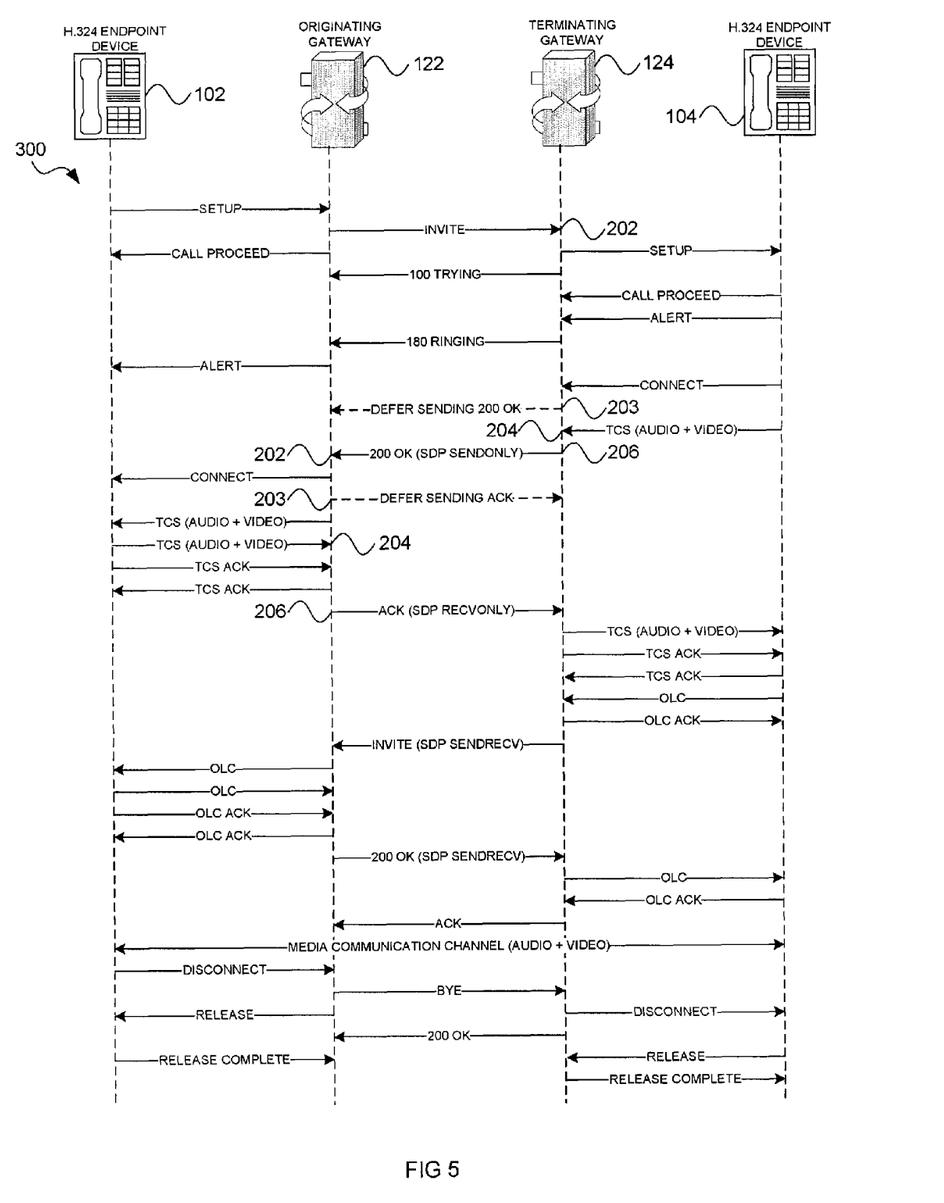
FIGS. 5 to 7 show interaction diagrams of communication messages performed by a method for interworking between H.324 and SIP, in accordance with an example embodiment.

FIG. 5 shows an interaction diagram 300 for initiating a connection from an H.324 endpoint device 102 to an H.324 endpoint device 104 across an IP network 120, as illustrated by way of example in system 100 in FIG. 1. It is to be emphasized that the endpoint devices 102, 104 may themselves operate in conventional fashion thus not requiring modification and may have audio only or audio and video capabilities. The originating gateway 122 and the terminating gateway 124 may facilitate the mapping of commands from one protocol to another. Thus, from the point of view of an endpoint device, it may appear that all communications occur in a single protocol with which the endpoint device and the network to which it is connected are compatible.

The interaction diagram 300 will first be described from the point of reference of the originating gateway 122. The originating gateway 122 is connected, on the one hand, via an ISDN/PSTN 112 to endpoint device 102 and thus all commands to this endpoint device 102 may be in the form of H.324 commands. On the other hand, the originating gateway 122 is connected via an IP network 122 to the terminating gateway 124 and thus all commands to the terminating gateway 124 may be in the form of SIP commands.

The originating gateway 122 receives an H.324 setup message from the H.324 endpoint device 102 to initiate a connection. In response thereto, the originating gateway 122, under command of the mapping module 172, sends a SIP INVITE message to the terminating gateway 124. The mapping library 176 of the originating gateway 122 may dictate which commands in one protocol are sent in response to receipt of commands in another protocol.

In conventional SIP communications, an INVITE message may include an indication of the capabilities supported by an endpoint downstream of the INVITE message. However, in this case, H.324 endpoint device 102 has not yet indicated its capabilities and thus the INVITE message will be silent as to the capabilities of the H.324 endpoint device 102. Nonetheless, the INVITE message for the purposes of the specification is still considered to be a SIP message indicative of capabilities supported by an endpoint device.

The originating gateway 122 then sends an H.324 CALL PROCEED message to the endpoint device 102 and receives a SIP 100 TRYING message followed by a 180 RINGING message from the terminating gateway 124. Next, the originating gateway 122 receives (see block 202) a SIP 200 OK message (e.g., SDP SendOnly) from the terminating gateway 124 which comprises an indication of the capabilities (both audio and video) supported by endpoint device 104. The originating gateway 122 sends a CONNECT message to endpoint device 102.

If the originating gateway 122 was an apparatus not in accordance with an example embodiment, the originating gateway 122 may at this stage send a SIP ACK message to the terminating gateway 124 to acknowledge receipt of the 200 OK message and thereby to initiate connection of a media communication channel.

Instead, in accordance with a present example embodiment, the originating gateway 122 defers, at block 203, sending the ACK message and sends an H.324 TCS message to endpoint device 102 to prompt the endpoint device 102 to respond with its capabilities. In response, the originating gateway 122 receives, at block 204, an H.324 TCS message indicative of the capabilities supported by the endpoint device 102. Messages acknowledging receipt of the TCS messages may be sent between endpoint device 102 and the originating gateway 122. Now, the SIP ACK message (e.g., SDP ReceiveOnly) may be sent, at block 206, to the terminating gateway 124, the message including an indication of the capabilities supported by endpoint device 124.

In accordance with an example embodiment, the originating gateway 122 receives a SIP INVITE message or command from the terminating gateway 124 which is the second INVITE message in the course of establishing the media communication channel. If desired, the originating gateway 122 could have sent the second INVITE message instead. This second INVITE may message include an indication of the configuration (e.g. audio and video codecs) which will actually be used for the media communication channel. The media communication channel may include a plurality of audio and/or video channels, for example including two audio channels and one video channel.

The originating gateway 122 sends and receives OLC (Open Logical Channel) messages to endpoint device 102 and sends and receives OLC ACK messages to acknowledge the opening of the logical channel. Thus, a logical channel between the endpoint device 102 and the originating gateway 122 is opened based on the audio and video codecs to be used. The originating gateway 122 then sends a SIP 200 OK message to the terminating gateway 124 and, in response, receives an ACK message indicating that the media communication channel may now be opened. The SIP 200 OK includes confirmation that the selected configuration (e.g. audio and video codecs) may be used.

The originating gateway 122 receives a second SIP ACK message from the terminating gateway 124 in response to the second 200 OK message and a communication channel between the respective H.324 endpoint devices 102, 104 is opened across which audio and or/video may be communicated using the negotiated codecs.

At any stage, any endpoint device 102, 104 may terminate the communication. The interaction diagram 300 shows the endpoint device 102 as initiating a request to terminate the communication. Therefore, the originating gateway 122 receives an H.324 DISCONNECT message and in response thereto forwards a SIP BYE message to the terminating gateway 124 and an H.324 RELEASE message to the endpoint device 102. The originating gateway 122 then receives a SIP 200 OK message and an H.324 RELEASE COMPLETE message respectively from the terminating gateway 124 and endpoint device 102.

The interaction diagram 300 will now be described from the point of reference of the terminating gateway 124 which may also implement the method 200 of FIG. 4.

The terminating gateway 124 receives a SIP INVITE message, at block 202. As stated above, an INVITE message in conventional SIP communication includes an indication of capabilities supported by an endpoint device. The INVITE message is thus deemed to be SIP message indicative of capabilities supported by an endpoint device regardless of the fact that in this case the message may actually be silent as to the capabilities supported by endpoint device 102. The terminating gateway 124 then sends an H.324 SETUP message to the H.324 endpoint device 104 and a SIP 100 TRYING message to the originating gateway 122. Further, the terminating gateway 124 receives respective H.324 CALL PROCEED and ALERT messages from the endpoint device 104. The terminating gateway 124 sends a SIP 180 RINGING message to the originating gateway 122 and receives an H.324 CONNECT message from the endpoint device 104.

At this stage, in SIP communications not in accordance with an example embodiment, the terminating gateway 124 may have sent a SIP 200 OK message to the originating gateway 122. However, in accordance with an example embodiment, the terminating gateway 124 defers, at block 203, sending the SIP 200 OK message. Instead, the terminating gateway 124 waits to receive, at block 204, an H.324 message (in this case in the form of a TCS message) from the endpoint device 104 indicative of the capabilities supported by the endpoint device 104. In response thereto, the terminating gateway 124 sends, at block 206, the SIP 200 OK message to the originating gateway 122, which includes an indication of the capabilities supported by the endpoint device 104.

The terminating gateway 124 receives an ACK message from the originating gateway 122 which now indicates the capabilities supported by the endpoint device 102. The terminating gateway 124 then sends and receives TCS and TCS ACK messages to the endpoint device 104 and receives an OLC message from the endpoint device to which it responds with an OLC ACK message.

In accordance with an example embodiment, the terminating gateway 124 now sends a SIP INVITE message to the originating gateway 122 indicative of an actual configuration to be used selected from the capabilities supported by both endpoint devices 102, 104. The actual configuration may be selected using existing algorithms based on configurations such as bandwidth, compatible codecs, or the like. The terminating gateway 124 then receives a 200 OK message (e.g., SDP SendReceive) confirming that the media communication channel can be opened and in response thereto opens a logical channel with the endpoint device 104 and acknowledges receipt with an ACK message to the originating gateway 122. A media communication channel is now available between the endpoint devices 102, 104 based on the actual configuration selected from the capabilities supported by the respective endpoint devices 102, 104.

Figure 6:
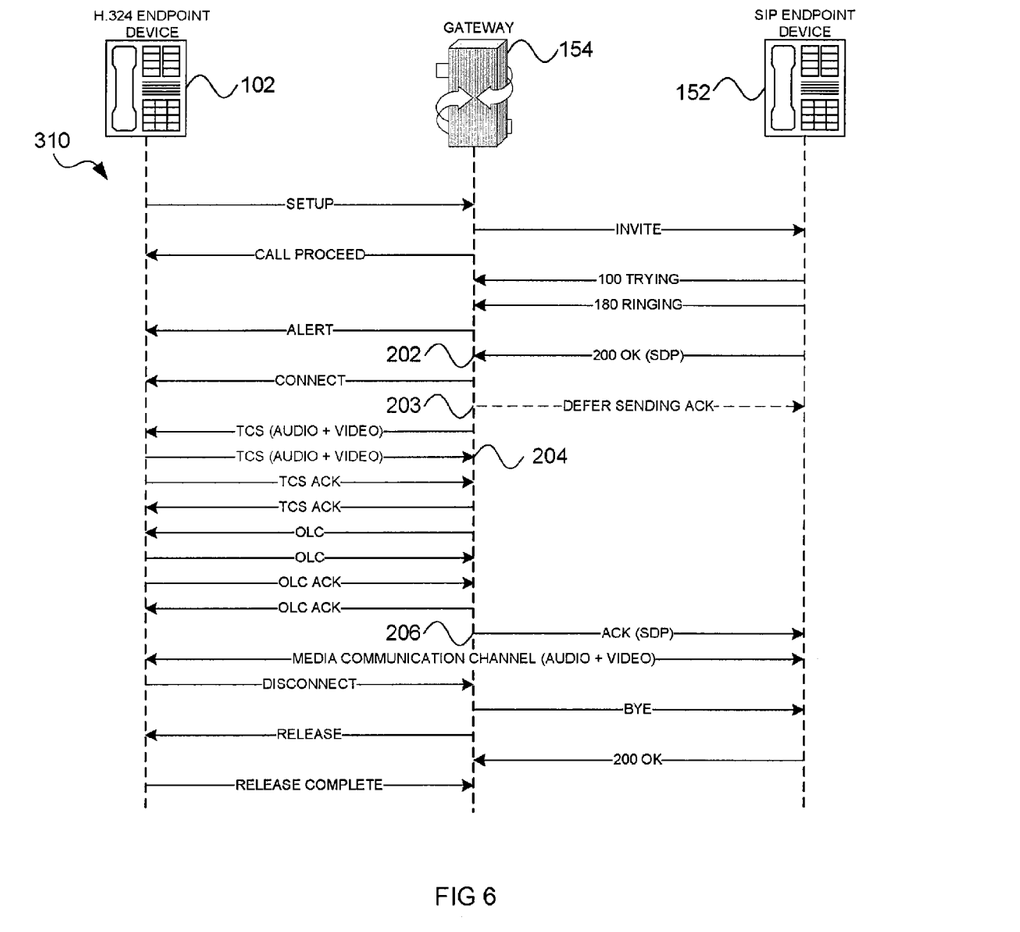

Referring now to FIG. 6, an interaction diagram 310 is illustrated showing communication messages in a method for interworking between H.324 and SIP where one endpoint device 102 is an H.324 endpoint device and the other one is a SIP endpoint device 152. In this example embodiment, only one gateway 154 may be required to map between SIP and H.324 (or H.320 as the case may be). FIG. 6 is best illustrated with reference also to FIG. 2, although it is to be understood that it is not necessarily limited to such a system configuration.

Most endpoint-to-gateway messages or commands are similar to those of the interaction diagram 300, so for ease of description, the interaction diagram 310 will further be described broadly with reference to the steps of the method 200. The H.324 endpoint device 102 is shown to initiate a communication channel with the SIP endpoint device 152. In response thereto, the gateway 154 sends a SIP INVITE message to the endpoint device 152 to which the endpoint device 152 responds with a 200 OK message and the gateway 154 receives this message (see block 202).

The gateway 154 defers (see block 203) sending the SIP ACK message to the endpoint device 152. Instead, the gateway 154 sends and receives a series of H.324 messages to the endpoint device 102, among other things to receive (at block 204) an indication of the capabilities supported by the endpoint device 102. Only after this, the gateway 154 responds (see block 206) with the SIP ACK message to the endpoint device 152 indicating that a media communication channel can now be established.

Figure 7:
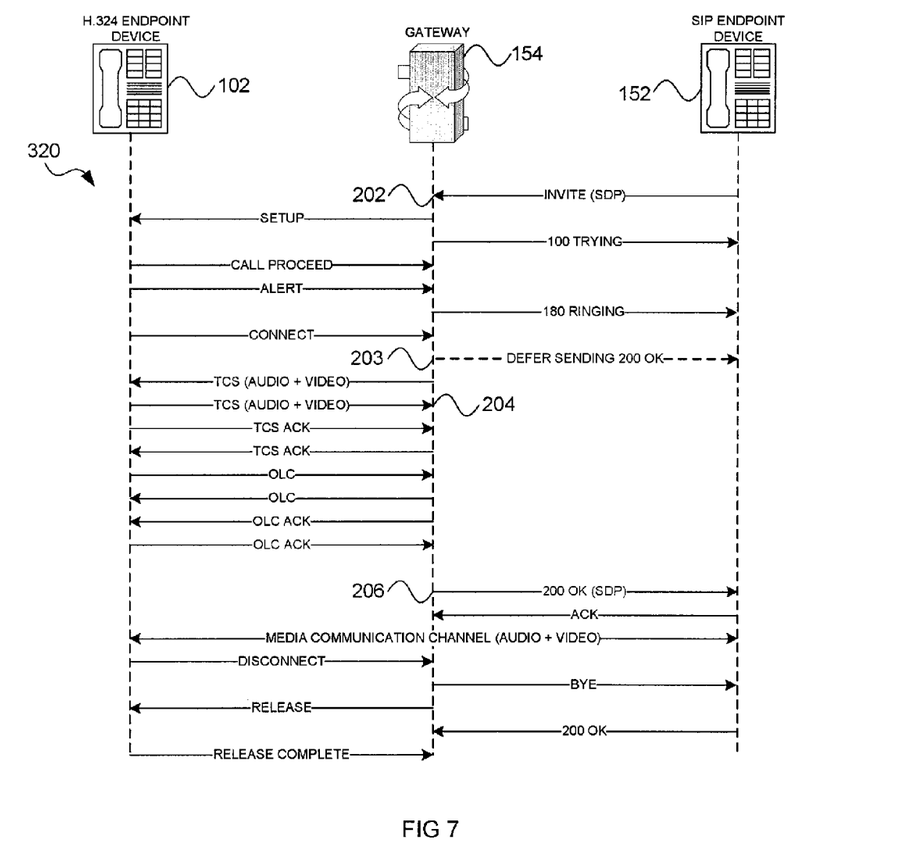

FIG. 7 shows an interaction diagram 320 which is similar to the interaction diagram 310 except that the SIP endpoint device 152 is shown to initiate the communication. In this example embodiment, the INVITE message which the gateway 154 receives, at block 202, does include configuration information of endpoint device 152 because it is a SIP-compatible endpoint device. The gateway 154 defers (see block 203) sending the 200 OK message and waits instead to receive an indication of the supported capabilities (see block 204) from the endpoint device 102. After this, the 200 OK message is sent (see block 206) to the endpoint device 152 which responds with an ACK message in response to which the media communication channel between the endpoint 102, 152 is opened.

Figure 8:
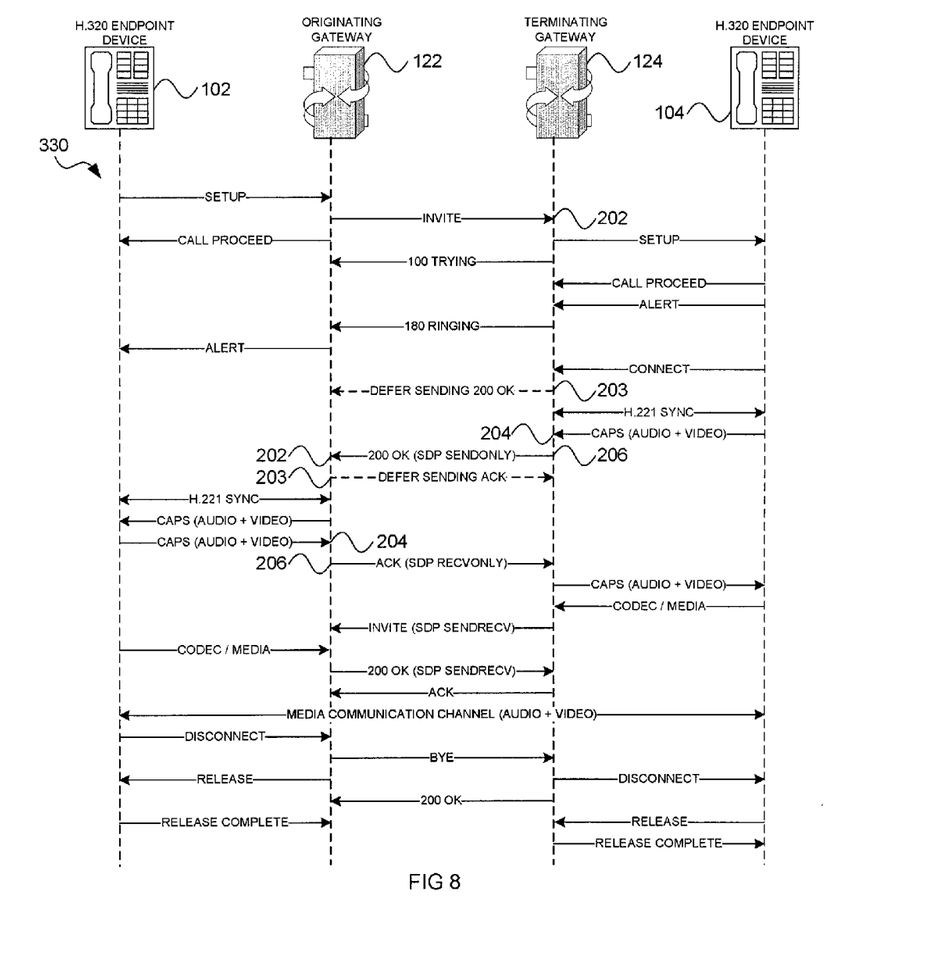
FIGS. 8 to 10 show interaction diagrams of communication messages performed by a method for interworking between H.320 and SIP, in accordance with an example embodiment.
Figure 9:
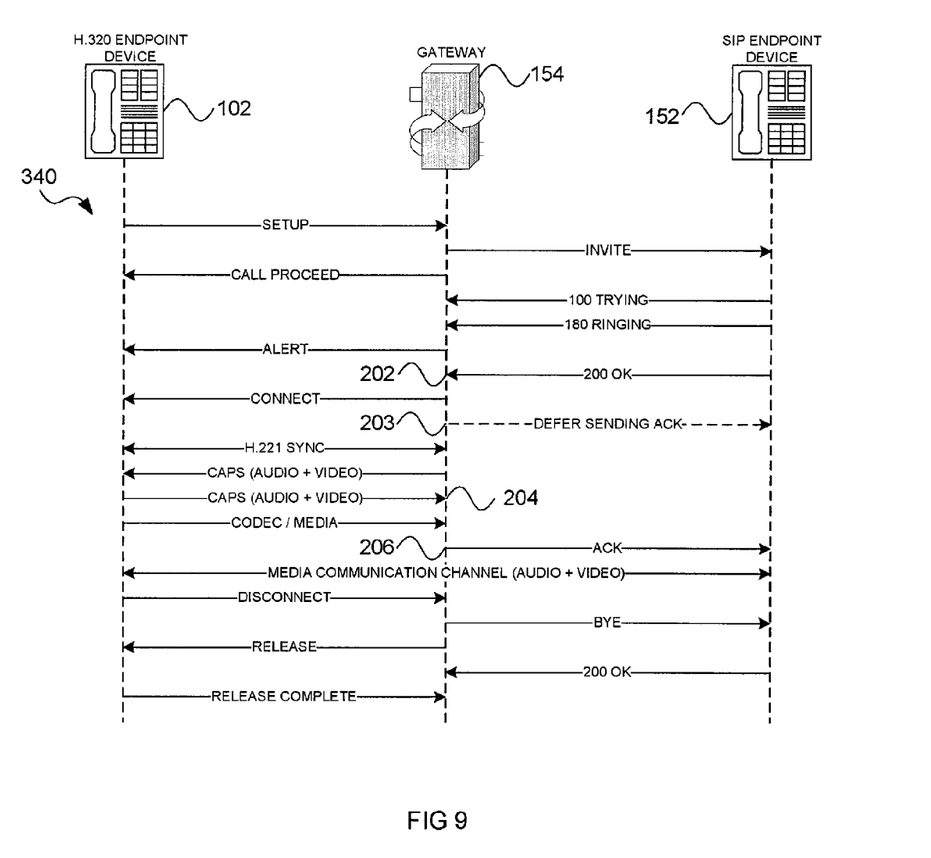
Figure 10:
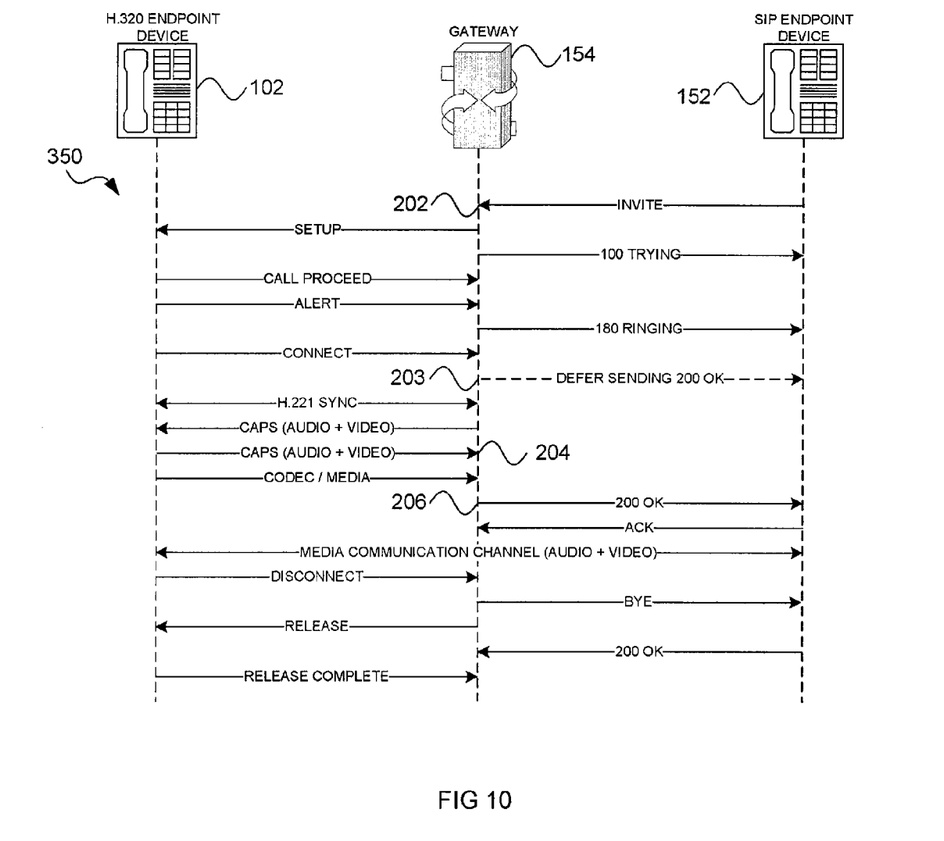

Referring now to FIGS. 8 to 10, respective interaction diagrams 330, 340, 350 are illustrated to show the specific operation of the method 200 for interworking between H.320 and SIP, in accordance with an example embodiment. FIGS. 8 to 10 (illustrating H.320) correspond to FIGS. 5 to 7 (illustrating H.324) and will therefore be described merely to illustrate the differences but will not be described in great detail.

The main differences between interaction diagram 300 and interaction diagram 330 are that the H.320 endpoint devices 102, 104 may be synchronized, with an H.221 SYNC message, with their respective gateways 122, 124 to communicate their capabilities. Further, their capabilities may be communicated using a CAPS message. Also, instead of opening a particular logical channel, the endpoint devices 102, 104 send a codec/media communication to the adjacent gateways 122, 124 to indicate which specific codecs particular media channels will use. Similar differences apply to interaction diagrams 340, 350 with respect to interaction diagrams 310, 320.

The other apparatus and methods described above allow mapping an ISDN or PSTN protocol to an IP-based protocol to establish media (audio and/or video) communications between two or more endpoints.

Figure 11:
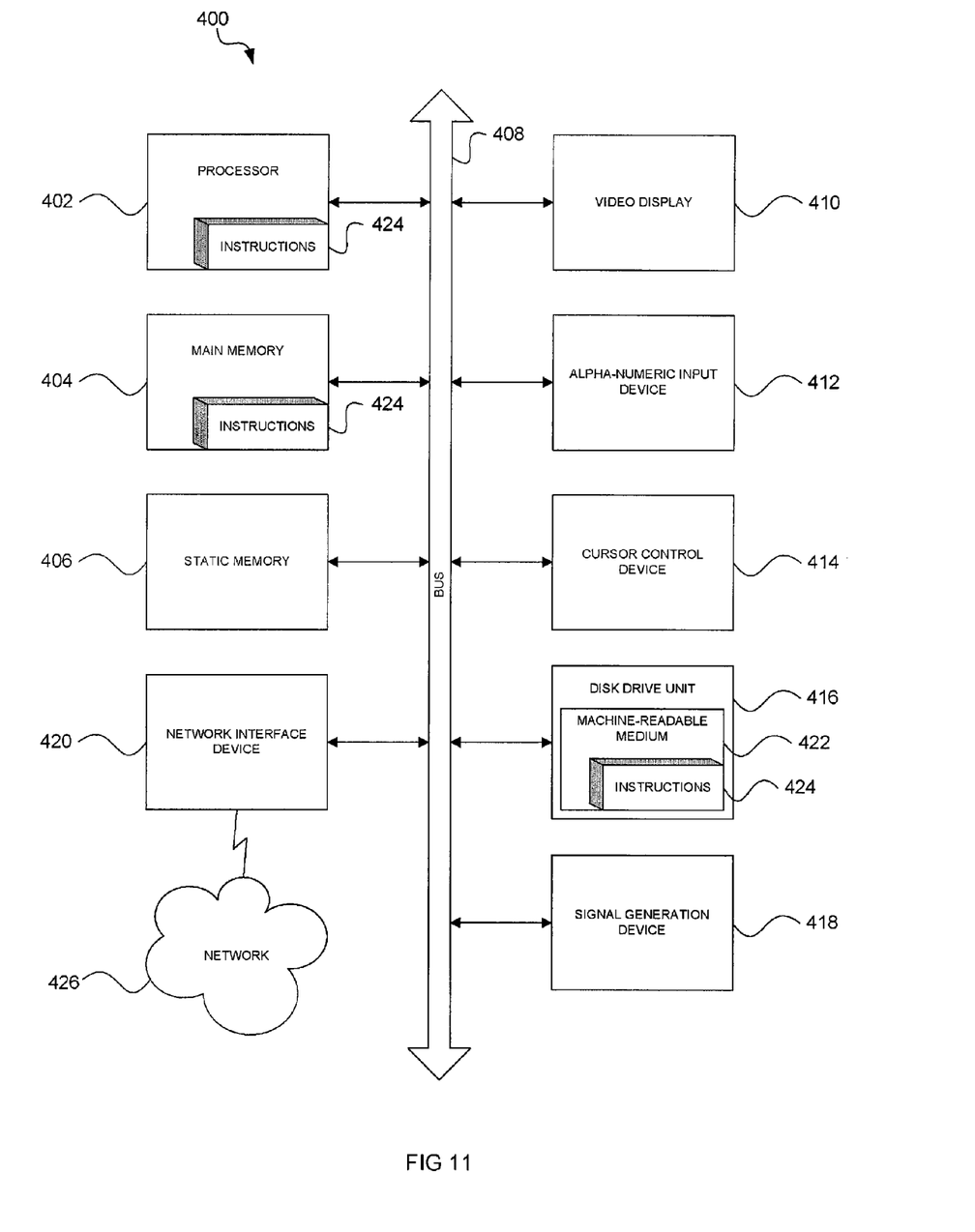
FIG. 11 shows a diagrammatic representation of a machine in the example form of a computer system within which a set of instructions, for causing the machine to perform any one or more of the methodologies discussed herein, may be executed.

FIG. 11 shows a diagrammatic representation of machine in the example form of a computer system 400 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404 and a static memory 406, which communicate with each other via a bus 408. The computer system 400 may further include a video display unit 410 (e.g., a plasma display, a liquid crystal display (LCD) or a cathode ray tube (CRT)). The computer system 400 also includes an alphanumeric input device 412 (e.g., a keyboard), a user interface (UI) navigation device 414 (e.g., a mouse), a disk drive unit 416, a signal generation device 418 (e.g., a speaker) and a network interface device 420.

The disk drive unit 416 includes a machine-readable medium 422 on which is stored one or more sets of instructions and data structures (e.g., software 424) embodying or utilized by any one or more of the methodologies or functions described herein. The software 424 may also reside, completely or at least partially, within the main memory 404 and/or within the processor 402 during execution thereof by the computer system 400, the main memory 404 and the processor 402 also constituting machine-readable media.

The software 424 may further be transmitted or received over a network 426 via the network interface device 420 utilizing any one of a number of well-known transfer protocols (e.g., FTP).

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present embodiments, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The gateway 120, 124, 154 may be in the form of machine 400.

It may be an advantage of one or more of the example embodiments that a convenient method for interworking communications between H.320/H.324 and SIP is provided. Further, the mapping of messages or commands between protocols may be transparent from the point of view of the endpoint devices 102, 104, 152 which therefore need not require any modification. Thus, existing endpoint devices 102, 104, 152 may communicate with one another over a combination of packet- and circuit-switched networks using various protocols particular to those networks. In addition, endpoint devices 102, 104 using the same protocol (e.g. H.320/H324) and now communicate with each other even though an intermediate network in the communication channel uses a different (SIP) protocol. If the IP network 120 is the Internet, example embodiments may provide a way in which to extend the range substantially of endpoint devices 102, 104 which themselves connect directly with a circuit-switched network (e.g. ISDN/PSTN).

What is claimed is:

1. A method comprising:
   receiving, into memory of a first gateway device, a SIP INVITE request from a second gateway device;
   establishing a media communication channel between a first H.320 or H.324 endpoint device associated with the first gateway device and a second H.320 or H.324 endpoint device associated with the second gateway device based on their respective capabilities;
   wherein establishing the media communication channel includes,
      sending by the first gateway device a SETUP message to the first H.320 or H.324 endpoint device;
      sending by the first gateway device a SIP 100 TRYING message to the second gateway device;
      receiving by the first gateway device a CONNECT message from the first H.320 or H.324 endpoint device;
      obtaining by the first gateway device information from the first H.320 or H.324 endpoint device indicative of the capabilities supported by the first H.320 or H.324 endpoint device, and
      responding by the first gateway device to the SIP INVITE request received from the second gateway device after the information has been obtained by the first gateway device that is indicative of the capabilities supported by the first H.320 or H.324 endpoint device.

2. The method of claim 1, wherein the capabilities supported by the first H.320 or H.324 endpoint device include audio capabilities only.

3. The method of claim 1, wherein the capabilities supported by the first H.320 or H.324 endpoint device include audio and video capabilities.

4. The method of claim 1, wherein:
   the respective capabilities of the first H.320 or H.324 endpoint device and the second H.320 or H.324 endpoint device include a codec; and
   the established media communication channel uses the codec.

5. An apparatus which comprises:
   one or more processors configured to:
      receive a SIP INVITE request from a gateway device;
      establish a media communication channel between a first H.320 or H.324 endpoint device and a second H.320 or H.324 endpoint device associated with the gateway device based on their respective capabilities;
      wherein establishing the media communication channel includes, sending a SETUP message to the first H.320 or H.324 endpoint device;
         sending a SIP 180 RINGING message to the-gateway device;
         receiving a CONNECT message from the first H.320 or H.324 endpoint device;

obtaining information from the first H.320 or H.324 endpoint device indicative of the capabilities supported by the first H.320 or H.324 endpoint device; and responding to the SIP INVITE request received from the gateway device after the information has been obtained that is indicative of the capabilities supported by the first H.320 or H.324 endpoint device.

6. The apparatus of claim 5, wherein the capabilities supported by the first H.320 or H.324 endpoint device include audio capabilities only.

7. The apparatus of claim 5, wherein the capabilities supported by the first H.320 or H.324 endpoint device include audio and video capabilities.

8. The apparatus of claim 5, wherein:
the respective capabilities of the first H.320 or H.324 endpoint device and the second H.320 or H.324 endpoint device include a codec; and
the established media communication channel uses the codec.

9. A system comprising:
a first gateway comprising:
one or more processors configured to:
receive a SIP INVITE request from a second gateway device;
establish a media communication channel between a first H.320 or H.324 endpoint device and a second H.320 or H.324 endpoint device associated with the second gateway device based on their respective capabilities;
wherein establishing the media communication channel includes:
sending a SETUP message to the first H.320 or H.324 endpoint device;
sending a SIP 100 TRYING message to the second gateway device;
receiving a CONNECT message from the first H.320 or H.324 endpoint device;
obtaining information from the first H.320 or H.324 endpoint device indicative of the capabilities supported by the first H.320 or H.324 endpoint device; and
responding to the request received from the second gateway device after the information has been obtained that is indicative of the capabilities supported by the first H.320 or H.324 endpoint device.

10. The system of claim 9, wherein the capabilities supported by the first H.320 or H.324 endpoint device include audio capabilities only.

11. The system of claim 9, wherein the capabilities supported by the first H.320 or H.324 endpoint device include audio and video capabilities.

12. The system of claim 9, wherein:
the respective capabilities of the first H.320 or H.324 endpoint device and the second H.320 or H.324 endpoint device include a codec; and
the established media communication channel uses the codec.

13. A non-transitory machine-readable medium embodying instructions which, when executed by a machine, cause the machine to:
receive a SIP INVITE request from a gateway device;
establish a media communication channel between a first H.320 or H.324 endpoint device and a second H.320 or H.324 endpoint device associated with the gateway device based on their respective capabilities;
wherein establishing the media communication channel includes:
sending a SETUP message to the first H.320 or H.324 endpoint device;
sending a SIP 100 TRYING message to the gateway device;
receiving a CONNECT message from the first H.320 or H.324 endpoint device;
obtaining information from the first H.320 or H.324 endpoint device indicative of the capabilities supported by the first H.320 or H.324 endpoint device; and
responding to the request received from the gateway device after the information has been obtained that is indicative of the capabilities supported by the first H.320 or H.324 endpoint device.

14. The machine-readable medium of claim 13, wherein the capabilities supported by the first H.320 or H.324 endpoint device include audio capabilities only.

15. The machine-readable medium of claim 13, wherein the capabilities supported by the first H.320 or H.324 endpoint device include audio and video capabilities.

16. The machine-readable medium of claim 13, wherein:
the respective capabilities of the first H.320 or H.324 endpoint device and the second H.320 or H.324 endpoint device include a codec; and
the established media communication channel uses the codec.

* * * * *